United States Patent
Seki et al.

(10) Patent No.: US 7,540,360 B2
(45) Date of Patent: Jun. 2, 2009

(54) MOUNTING STRUCTURE OF SPEED REDUCTION DEVICE AND BRAKE DEVICE OF VEHICLE

(75) Inventors: Bunzo Seki, Wako (JP); Shigeto Inami, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 283 days.

(21) Appl. No.: 11/678,765

(22) Filed: Feb. 26, 2007

(65) Prior Publication Data

US 2007/0199776 A1    Aug. 30, 2007

(30) Foreign Application Priority Data

Feb. 27, 2006    (JP)    .............. 2006-051335

(51) Int. Cl.
B62L 5/00    (2006.01)
(52) U.S. Cl. .............. 188/26; 188/71.1; 188/219.1; 188/73.31; 188/18 A
(58) Field of Classification Search .............. 188/26, 188/71.1, 344, 219.1, 328, 73.31, 18 A, 218 R
See application file for complete search history.

(56) References Cited

U.S. PATENT DOCUMENTS

| 4,723,638 | A  | * | 2/1988 | Tsuchida ............... 188/344 |
| 6,450,301 | B1 | * | 9/2002 | Iizuka et al. ............ 188/26 |
| 7,232,014 | B2 | * | 6/2007 | Nakaie ................. 188/71.1 |
| 7,407,043 | B2 | * | 8/2008 | Fujita et al. ........... 188/73.31 |

FOREIGN PATENT DOCUMENTS

JP    2003-056607 A    2/2003

* cited by examiner

*Primary Examiner*—Melanie Torres
(74) *Attorney, Agent, or Firm*—Westerman, Hattori, Daniels & Adrian, LLP.

(57) ABSTRACT

A mounting structure for a speed reduction device of a vehicle includes a vehicle frame, a casing mounted on the vehicle frame at a casing mounting portion, a brake caliper mounted to the casing at a caliper mounting portion, a brake disc mounted on a drive axle of the vehicle, and a clamping portion mounted on the brake caliper for applying clamping force to the brake disc. The clamping portion, the caliper mounting portion, and the casing mounting portion are positioned on a substantially straight line, and are positioned substantially parallel to the direction of braking force.

2 Claims, 8 Drawing Sheets

MOUNTING STRUCTURE OF SPEED REDUCTION DEVICE AND BRAKE DEVICE OF VEHICLE

FIELD OF THE INVENTION

The present invention relates to an improvement of the mounting structure of a speed reduction device and a brake device of a vehicle.

BACKGROUND OF THE INVENTION

As the conventional mounting structure of a speed reduction device and a brake device of a vehicle, there has been known a mounting structure which mounts a bevel gear mechanism on a rear portion of a vehicle body as a speed reduction device and provides a rear wheel braking device to the bevel gear mechanism and a drive axle which extends to the bevel gear mechanism side from a drive source side. See, for example, JP-A-2003-56607 (JP '607).

As shown, for example, in FIG. 3, FIG. 9 and FIG. 11 of JP '607, a bevel gear mechanism 49 which distributes power to left and right axles 50, 50 by reducing a speed is positioned on a rear portion of a vehicle body, an engine 20 and a variable transmission 21 which is disposed close to the engine 20 are positioned at a center portion of the vehicle body, and the bevel gear mechanism 49 is connected to a rear wheel drive axle 47 which is extended rearward from the variable transmission 21 by way of a connection cylindrical member 56.

The connection cylindrical member 56 mounts a disc rotor 71 which constitutes a rear wheel braking device 70 thereon, while a gear case 51, which includes a bevel gear mechanism 49, is a member which mounts a brake caliper 72 which constitutes the rear wheel braking device 70 thereon by way of a mounting plate 73b. In the drawing, numerals 74, 74 indicate pads which clamp the disc rotor 71 at the time of applying braking to the disc rotor 71.

The mounting plate 73b which supports the above-mentioned brake caliper 72 is configured to extend an arm portion to the outside in the radial direction from an axis side of the connection cylindrical member 56, and mounts the brake caliper 72 on the arm portion. Accordingly, in applying braking to the disc rotor 71 by clamping the disc rotor 71 with pads 74, 74, an external force acts on the distal end side of the mounting plate 73b by way of the brake caliper 72 and hence, a large moment is generated on the mounting plate 73b.

Accordingly, to receive such a moment, it is necessary, for example, to increase a strength of the mounting plate 73b by increasing a plate thickness of the arm portion of the mounting plate 73b or to increase a width of the arm portion in the direction from a front surface to a back surface of this paper thus leading to the large-sizing and the increase of weight of the mounting plate 73b.

Accordingly it is an object of the invention to achieve the reduction of weight and a miniaturization of the mounting structure of a speed reduction device and a brake device.

SUMMARY OF THE INVENTION

According to the present invention, a mounting structure for a speed reduction device of a vehicle includes a vehicle frame, a casing mounted on the vehicle frame at a casing mounting portion, a brake caliper mounted to the casing at a caliper mounting portion, a brake disc mounted on a drive axle of the vehicle, and a clamping portion mounted on the brake caliper for applying clamping force to the brake disc. The clamping portion, the caliper mounting portion, and the casing mounting portion are positioned on a substantially straight line, and are positioned substantially parallel to the direction of braking force.

By positioning the clamping portion, the caliper mounting portion, and the casing mounting portion on a substantially straight line, at the time of applying braking to brake disc using the brake caliper, the direction of a braking force which acts on the brake caliper, the casing and the vehicle body frame agrees with or is positioned substantially parallel to the direction that the above-mentioned straight line extends.

Accordingly, the mounting structure can effectively receive the braking force which acts on the clamping portion, and the structure of the speed reduction device mounting portion and the brake device mounting portion can be reduced in size and weight, thus realizing the miniaturization and the reduction of weight of the vehicle.

According to another aspect of the present invention, arm supporting portions which respectively support suspension arms are provided on left and right sides of the vehicle body frame, a cross member is extended between the vehicle body frame in the vicinity of arm support portions, and the casing is mounted on the cross member.

By extending the cross member between the left and right vehicle body frames in the vicinity of the arm support portions, the rigidity of the left and right vehicle body frames in the vicinity of the arm support portions is enhanced.

Accordingly, it is possible to increase the rigidity of the vehicle body frame in the vicinity of the arm support portions whereby the rigidity of the vehicle body frame with respect to an input to the vehicle body frame from the suspension can be easily ensured.

BRIEF DESCRIPTION OF THE DRAWINGS

A preferred embodiment of the present invention is described with reference to the accompanying drawings, wherein.

DETAILED DESCRIPTION OF THE INVENTION

Embodiments of the invention are described below with reference to the accompanying drawings. The drawings shall be viewed from the direction of the reference numerals.

Figure 1:
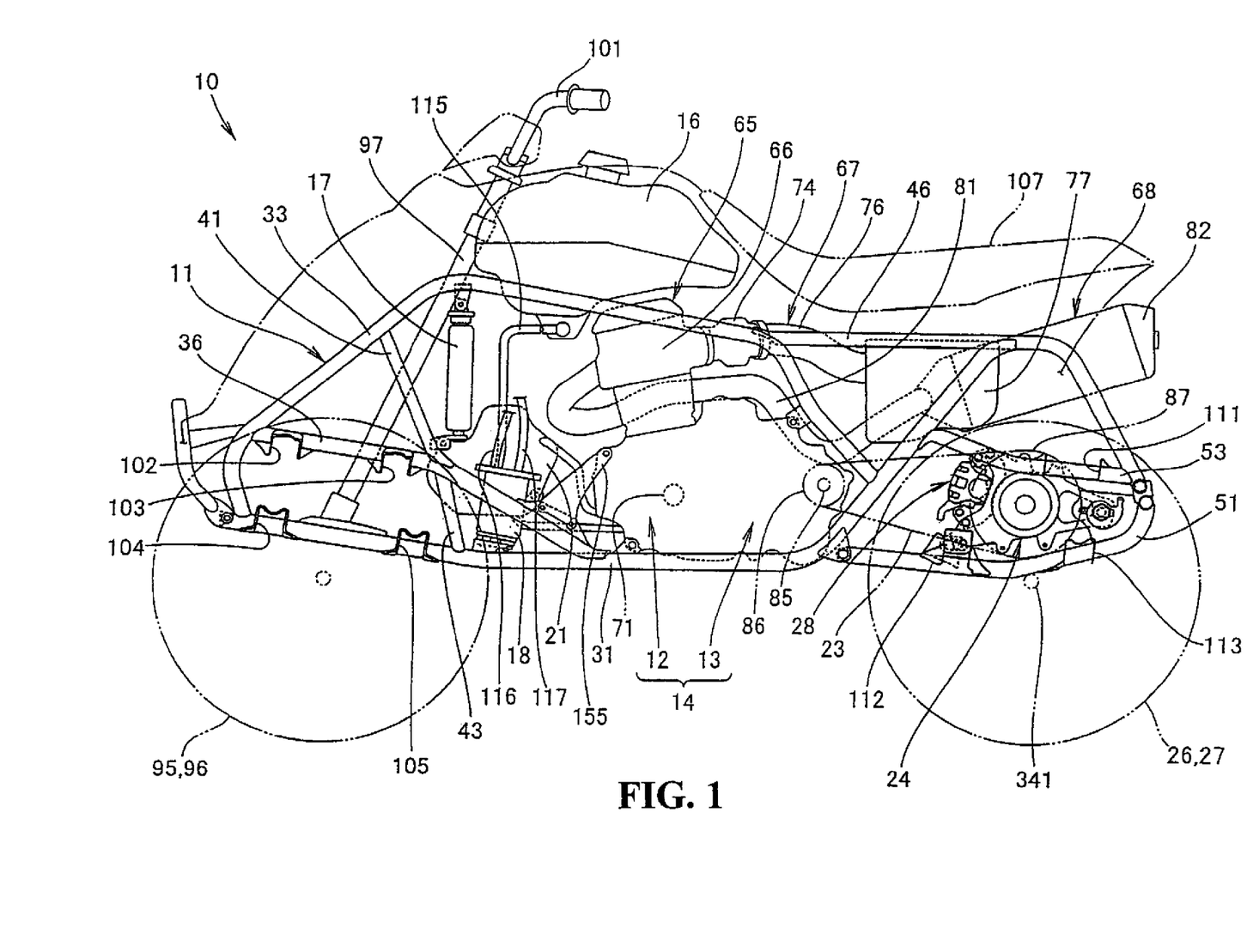
FIG. 1 is a side view of a vehicle according to the invention.

FIG. 1 is a side view of a vehicle according to the invention, wherein a vehicle 10 is a terrain traveling four-wheeled vehicle having the following constitution. A power unit 14 which is constituted of an engine 12 and a transmission 13 which is integrally formed with the engine 12 is mounted on a center portion of a vehicle body frame 11. A fuel tank 16 is positioned above the power unit 14. In a space below the fuel tank 16 and between the radiator 17 and the power unit 14, a fuel pump 18 which supplies fuel inside the fuel tank 16 to the engine 12 and an oil tank 21 which stores lubricant used in the inside of the power unit 14 are positioned. A speed reduction device 24 which transmits power via a chain 23 is positioned behind the power unit 14. A disc brake device 28 for braking left and right rear wheels 26, 27 is attached to the speed reduction device 24.

The vehicle body frame 11 includes a pair of left and right lower main frames 31, 32 (indicating only front-side symbol 31) which support the power unit 14, a pair of left and right upper main frames 33, 34 (indicating only front-side symbol 33) which are mounted on front ends and rear portions of the pair of left and right lower main frames 31, 32, a pair of left and right inclined frames 36, 37 (indicating only front-side symbol 36) which are extended in an inclined manner to intermediate portions of the lower main frames 31, 32 from front portions of the upper main frames 33, 34, upper reinforcing frames 41, 42 (indicating only front-side symbol 41) which respectively connect the inclined frames 36, 37 and the upper main frames 33, 34, lower reinforcing frames 43, 44 (indicating only front-side symbol 43) which respectively connect the inclined frames 36, 37 and the lower main frames 31, 32, rear upper frames 46, 47 (indicating only front-side symbol 46) which are mounted on rear upper portions of the upper main frames 33, 34 and rear ends of the lower main frames 31, 32, rear lower frames 51, 52 (indicating only front-side symbol 51) which are connected to rear ends of the rear upper frames 46, 47 and rear lower portions of the lower main frames 31, 32, and rear sub frames 53, 54 (indicating only front-side symbol 53) which are respectively mounted on rear portions of the lower main frames 31, 32 and rear ends of the rear upper frames 46, 47.

The engine 12 mounts a cylinder head 66 on a cylinder portion 65 which extends upwardly and an intake device 67 and an exhaust device 68 are mounted on the cylinder head 66. Here, numeral 71 indicates a crankshaft provided to the engine 12.

The intake device 67 is constituted of a throttle body 74 which is mounted on a rear portion of the cylinder head 66 and an air cleaner 77 which is connected to the throttle body 74 via a connecting tube 76.

The exhaust device 68 is constituted of an exhaust pipe 81 which has one end thereof mounted on the cylinder head 66 and a muffler 82 which is connected to another end of the exhaust pipe 81.

The transmission 13 is configured such that an output shaft 85 projects toward a rear side portion and a drive sprocket 86 is mounted on the output shaft 85. A chain 23 is extended between the drive sprocket 86 and a driven sprocket 87 provided to the speed reduction device 24 side.

In the drawings, numerals 95, 96 indicate front wheels, numeral 97 indicates a steering shaft which is rotatably mounted on the vehicle body frame 11 for steering the front wheels 95, 96, numeral 101 indicates a bar handle which is mounted on an upper end of the steering shaft 98, numerals 102 to 105 indicate a pair of left and right front suspension arm brackets which is mounted on the vehicle body frame 11 for mounting suspension arms for the front wheels 95, 96, numeral 107 indicates a seat, numerals 111 to 113 indicate rear suspension arm brackets which are mounted on the vehicle body frame 11 for mounting suspension arms for rear wheels 26, 27, numerals 115 to 117 indicate fuel hoses (a fuel supply pipe from the fuel tank 16 to the fuel pump 18, a fuel supply pipe from the fuel pump 18 to an injector not shown in the drawing which is mounted on a throttle body 74, a return pipe from the fuel pump 18 to the fuel tank 16), and numeral 155 indicates an engine hanger.

Figure 2:
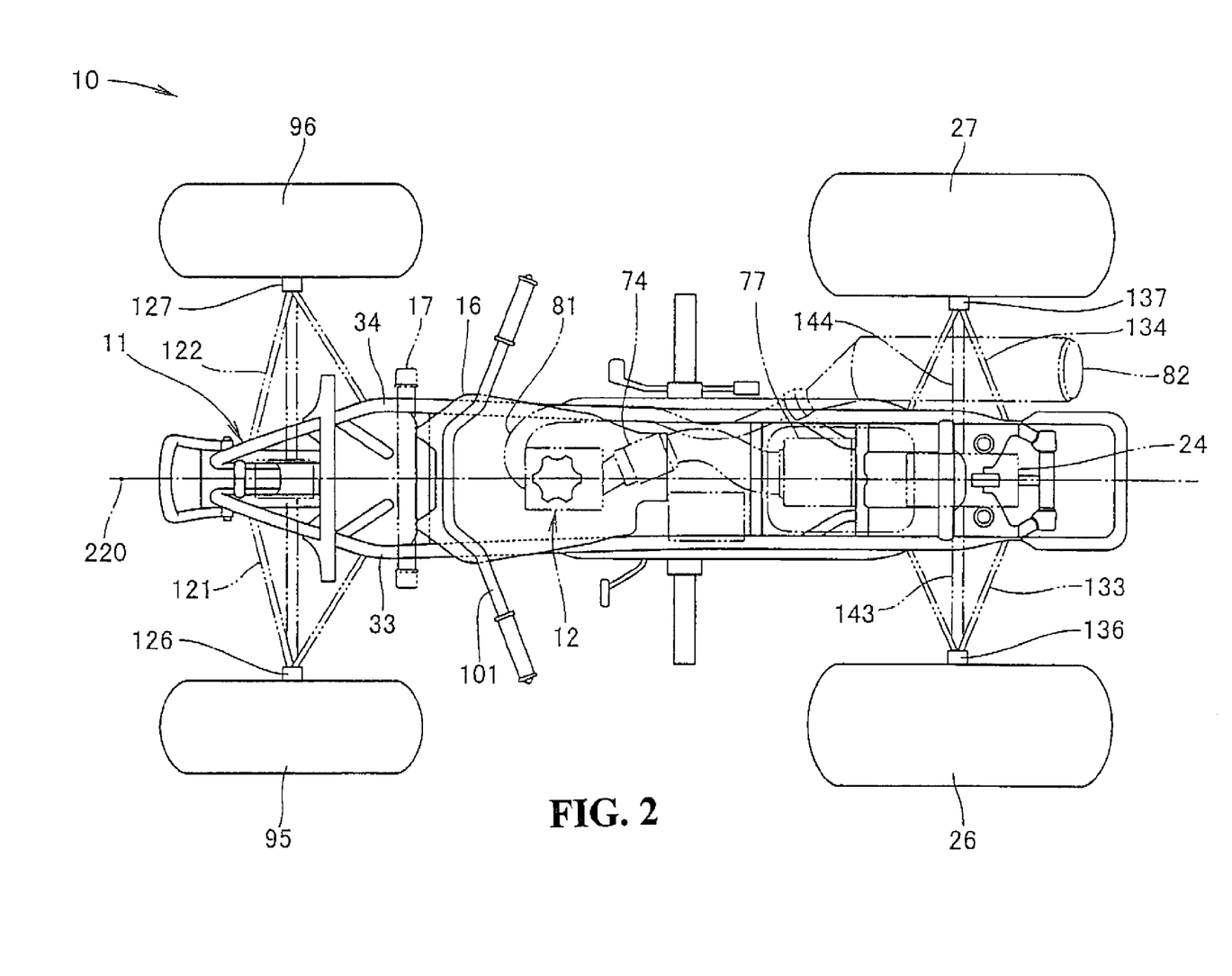
FIG. 2 is a plan view of the vehicle according to the invention.

FIG. 2 is a plan view of the vehicle according to the invention, wherein a pair of left and right upper arms 121, 122 and a pair of left and right lower arms (not shown in the drawing) which constitute suspension arms for front wheels extend from the vehicle body frame 11. Knuckles 126, 127 are respectively mounted on distal ends of these upper arms 121, 122 and the pair of left and right lower arms. Hubs (not shown in the drawing) are respectively rotatably mounted on these knuckles 126, 127. The front wheels 95, 96 are respectively mounted on these hubs. A pair of left and right upper arms (not shown in the drawing) and a pair of left and right lower arms 133, 134 which constitute suspension arms for rear wheels extend from the vehicle body frame 11. Knuckles 136, 137 are respectively mounted on distal ends of these upper arms and the pair of left and right lower arms 133, 134. Hubs (not shown in the drawing) are respectively rotatably mounted on these knuckles 136, 137. The rear wheels 26, 27 are respectively mounted on these hubs. Here, numerals 143, 144 indicate the left drive shaft and the right drive shaft which extend from the speed reduction device 24 for driving the left and right rear wheels 26, 27.

Figure 3:
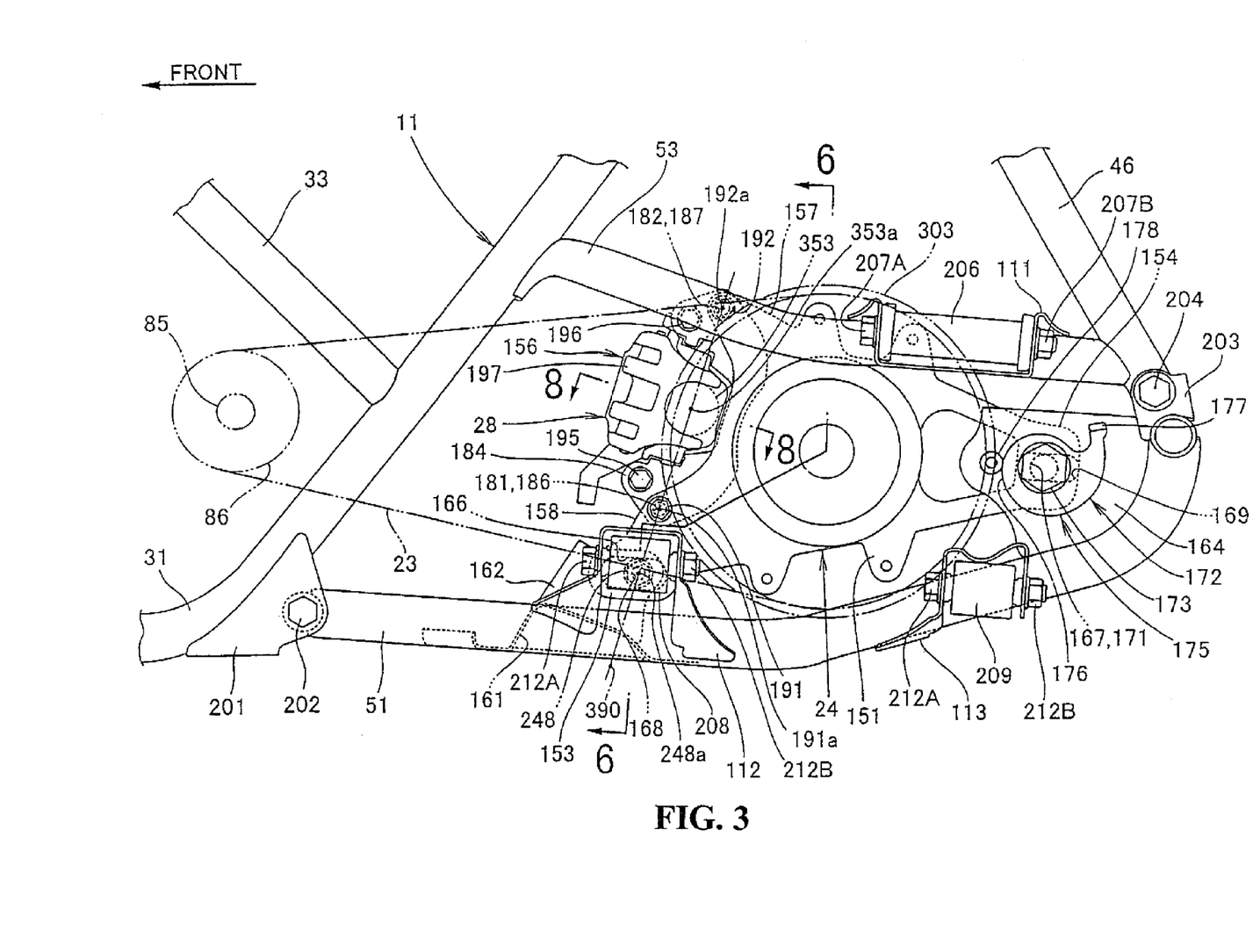
FIG. 3 is a rear side view of the vehicle according to the invention.

FIG. 3 is a rear side view of the vehicle according to the invention (arrow (FRONT) indicating a frontward direction of the vehicle), wherein the speed reduction device 24 includes a casing 151 and the casing 151 is a member to which a front mounting portion 153 and a rear mounting portion 154 which are mounted on a vehicle body frame 11 side, and caliper mounting portions 157, 158 which mount a brake caliper 156 constituting the disc brake device 28 thereon are provided.

The left and right rear lower frames 51, 52 (indicating only front-side symbol 51) are members between which a cross member 161 is extended and a casing front mounting bracket 162 included in the vehicle body frame 11 is mounted on the cross member 161.

In mounting of the casing 151 on the vehicle body frame 11 side, to be more specific, a front mounting portion 153 of the casing 151 is mounted on a casing front mounting bracket 162, and a rear mounting portion 154 of the casing 151 is mounted on a casing rear mounting bracket 164 which is mounted on rear portions of the left and right rear lower frames 51, 52.

A front mounting elongated hole 166 which is elongated in the longitudinal direction is formed in the front mounting portion 153 of the casing 151, a rear mounting circular hole 167 is formed in the rear mounting portion 154, front circular holes 168, 168 (indicating only front-side symbol 168) are formed in the casing front mounting bracket 162, and rear elongated holes 169, 169 (indicating only front-side symbol 169) which are elongated in the longitudinal direction are formed in the casing rear mounting bracket 164.

Figure 6:
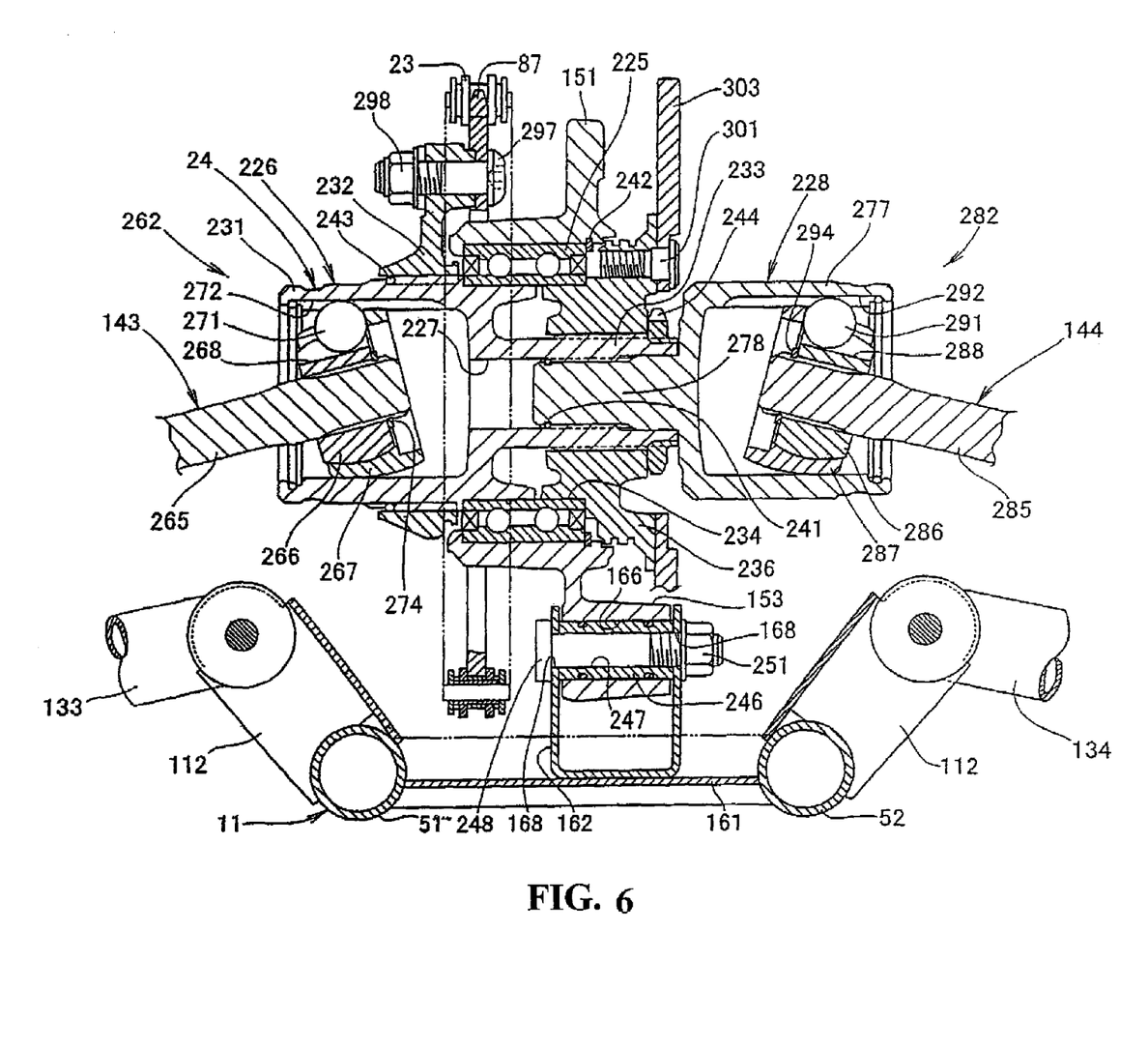
FIG. 6 is a cross-sectional view of the speed reduction device and a vehicle body frame according to the invention.

The detail of the mounting of the casing 151 on the casing front mounting bracket 162 is explained in conjunction with FIG. 6.

To explain the detail of the mounting of the casing 151 on the casing rear mounting bracket 164, a plate-like cam member 172 in which a circular hole 171 is formed is brought into contact with both side surfaces of the casing rear mounting bracket 164 respectively, and a bolt 173 is made to pass through a circular hole 171 formed in one cam member 172, the rear elongated hole 169 formed in the casing rear mounting bracket 164, the rear mounting circular hole 167 formed in the casing 151, the rear elongated hole 169 formed in another casing rear mounting bracket 164, and the circular hole 171 formed in another cam member 172 sequentially and, thereafter, a nut (not shown in the drawing) is threadedly engaged with a distal end of the bolt 173.

By slackening the bolt 173, due to the fitting of the bolt 173 in the rear elongated hole 169 formed in the casing rear mounting bracket 164, it is possible to move the casing 151 in the longitudinal direction with respect to the casing rear mounting bracket 164.

The cam member 172 includes a cam surface 176 which is formed by continuously changing a distance from the center of the circular hole 171 and a projecting portion 177 for rotating the cam member 172 with a hand or a tool on an outer periphery 175 thereof. By gradually increasing the cam surface 176 which is brought into contact with a projection 178 which is formed on the casing rear mounting bracket 164 along with the rotation of the cam member 172, the casing 151 is moved toward a rear portion of the vehicle together with the bolt 1 73 thus adjusting the tension of the chain 23.

The mounting of the brake caliper 156 on the caliper mounting portions 157, 158 is performed such that caliper mounting holes 181, 182 are preliminarily formed in the respective caliper mounting portions 157, 158, bracket-side female threads 186, 187 are preliminarily formed in a caliper bracket 184 which constitutes the brake caliper 156, a bolt 191 is threaded into the bracket-side female threads 186 through the caliper mounting hole 181. Further, the bolt 192 is threaded into the bracket-side female threads 187 through the caliper mounting hole 182.

The brake caliper 156 is constituted of the above-mentioned caliper bracket 184 and the caliper body 197 which is movably mounted on the caliper bracket 184 in the front-and-back direction of a paper surface using pins 195, 196.

The rear lower frames 51, 52 have respective front ends thereof detachably mounted on rear first brackets 201, 201 (indicating only front-side symbol 201) which are mounted on the lower main frames 31, 32 (indicating only front-side symbol 31) using bolts 202, 202 (indicating only front-side symbol 202), and has rear second brackets 203, 203 (indicating only front-side symbol 203) mounted on rear end portions thereof respectively detachably mounted on rear ends of the rear upper frames 46, 47 (indicating only front-side symbol 46) using bolts 204, 204 (indicating only front-side symbol 204). Here, numeral 206 indicates a proximal portion of an upper arm which is mounted on the rear suspension arm bracket 111 using a bolt 207A and a nut 207B, and numerals 208, 209 indicate proximal portions of the lower arms 133, 134 (see FIG. 2) mounted on the rear suspension arm brackets 112, 113 respectively using a bolt 212A and a nut 212B.

Figure 4:
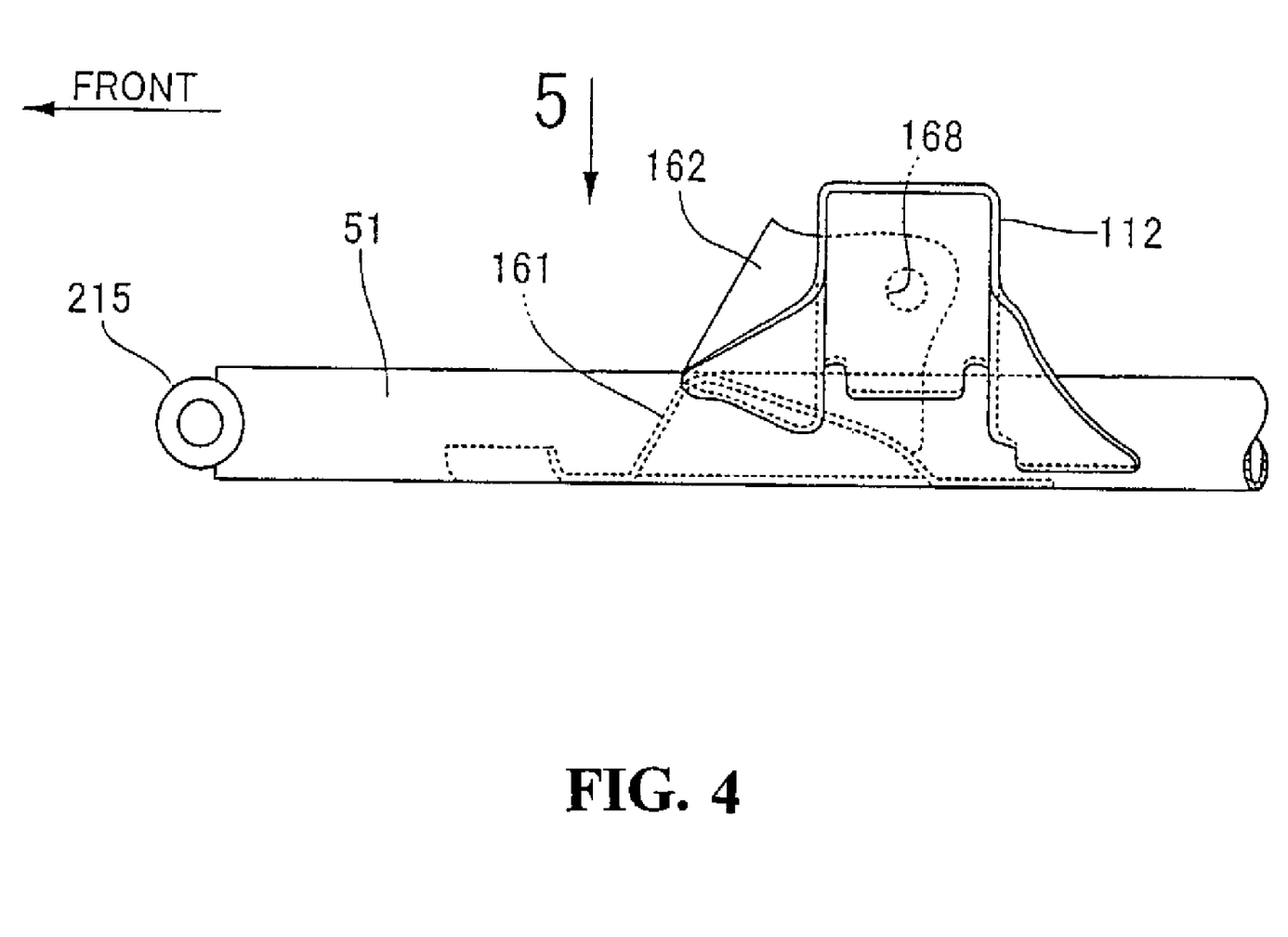
FIG. 4 is a side view showing a front portion of a rear lower frame of a vehicle according to the invention.

FIG. 4 is a side view showing a front portion of a rear lower frame of a vehicle according to the invention. As shown in the drawing, the cross member 161 and the casing front mounting bracket 162 are positioned to overlap the rear suspension arm brackets 112, 112 (indicating only front-side symbol 112) which are mounted on the rear lower frames 51, 52 (indicating only front-side symbol 51) as viewed in a side view. Here, numerals 215, 215 (indicating only front-side symbol 215) indicate cylindrical members which are mounted on front ends for connecting the rear lower frames 51, 52 to the lower main frames 31, 32 (see FIG. 3).

Figure 5:
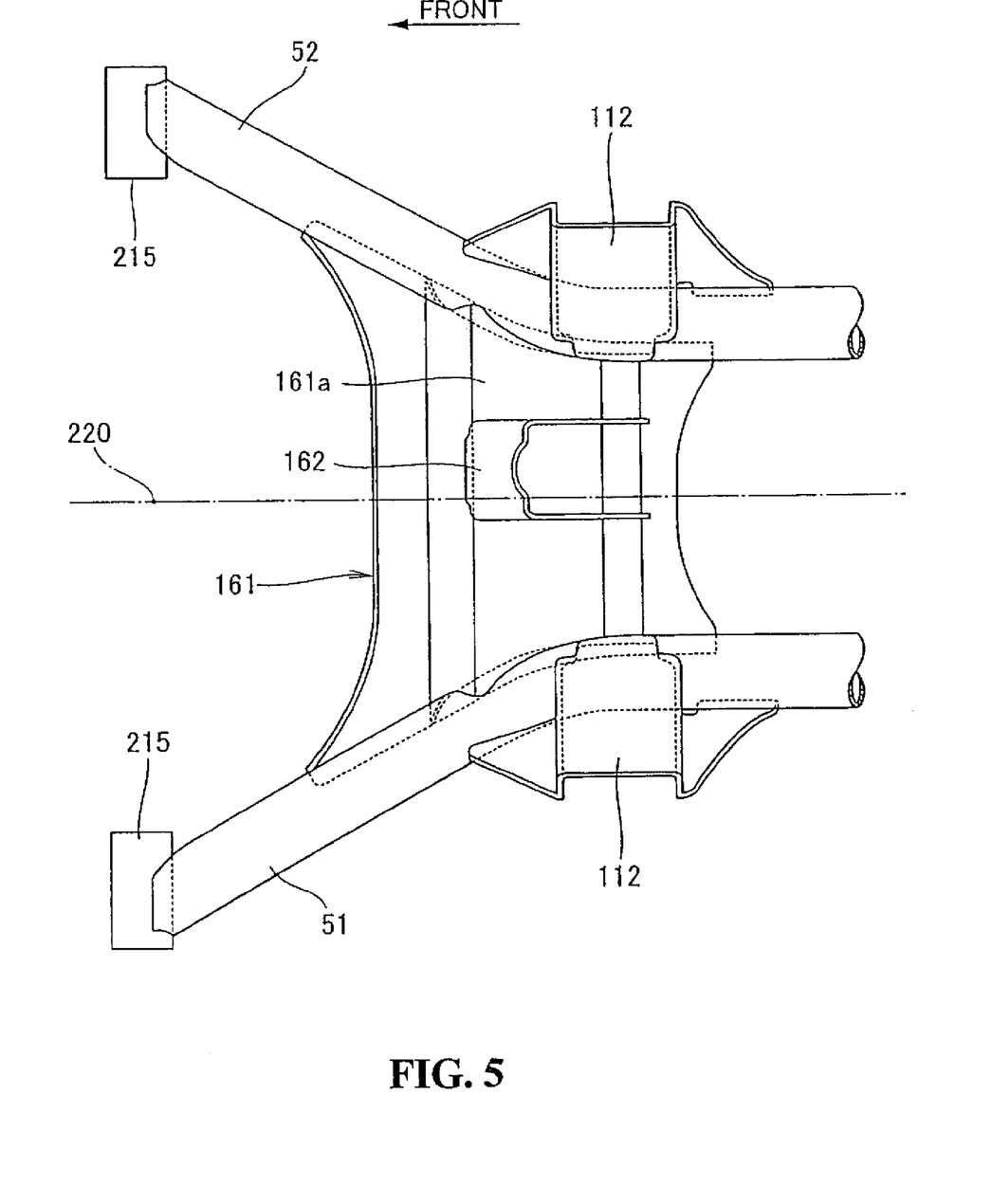
FIG. 5 is a view as viewed in the direction of an arrow 5 in FIG. 4.

FIG. 5 is a view as viewed in the direction of an arrow 5 in FIG. 4. As shown in the drawing, a plate-like cross member 161 is mounted in a state that cross member 161 extends between the pair of left and right rear lower frames 51, 52 and, at the same time, is positioned inside the pair of left and right rear suspension arm brackets 112, 112, and the casing front mounting bracket 162 is mounted on an upper surface 161a of the cross member 161 at a position close to the rear lower frame 52 with respect to a vehicle body center line 220 which extends in the longitudinal direction of the vehicle.

The cross member 161 is formed by bending a flat plate so as to increase the bending rigidity. By increasing the rigidity of the cross member 161, the mounting of the casing front mounting bracket 162 can be strengthened thus surely supporting the speed reduction device 24 (see FIG. 3). Further, it is possible to increase the rigidity of the rear lower frames 51, 52, to be more specific, the rigidity of portions of the rear lower frames 51, 52 on which the rear suspension arm brackets 112, 112 are mounted and hence, the rigidity of the rear lower frames 51, 52 with respect to an input from the rear suspension, and eventually, the rigidity of the vehicle body frame 11 can be easily ensured.

FIG. 6 is a cross-sectional view of the speed reduction device and the vehicle body frame according to the invention, and corresponds to a cross-sectional view taken along a line 6-6 in FIG. 3.

The speed reduction device 24 includes a hollow left drive axle forming member 226 which is rotatably mounted on the casing 151 by way of a bearing 225, a right drive axle forming member 228 which is joined to a hollow portion 227 of the left drive axle forming member 226 by spline engagement, a sprocket support flange 232 which is joined to an outer peripheral surface of an outer ring 231 formed on the left drive axle forming member 226 by spline engagement, and a disk support flange 236 which is joined to an outer peripheral surface of the left drive axle 233 which is formed on the left drive axle forming member 226 by spline engagement and, at the same time, is fitted in an inner peripheral surface 234 of the bearing 225.

Here, numeral 241 indicates a retainer ring which makes the removal of the right drive axle forming member 228 from the hollow portion 227 of the left drive axle forming member 226 difficult, numeral 242 indicates a retainer ring which prevents a bearing 225 from being removed from the casing 151, numeral 243 indicates a retainer ring which prevents the sprocket support flange 232 from being removed from the outer ring 231 of the left drive axle forming member 226, numeral 244 indicates a nut which is threadedly joined to a distal end portion of the left drive axle 233 for preventing the removal of a disc support flange 236 from the left drive axle 233 of the left drive axle forming member 226.

The casing 151 is a member which is mounted on the vehicle body frame 11 side by fitting a collar 246 into the front mounting elongated hole 166 formed in the front mounting portion 153, by allowing a bolt 248 to pass through the front circular holes 168, 168 of the casing front mounting bracket 162 and a through hole 247 formed in the collar 246, and by threadedly engaging the nut 251 with a distal end of the bolt 248.

Since the collar 246 is movably fitted in the front mounting elongated hole 166 formed in the casing 151, it is possible to move the casing 151 in the longitudinal direction with respect to the collar 246.

The left drive axle forming member 226 is integrally formed with the above-mentioned outer ring 231 and left drive axle 233 by molding, wherein the outer ring 231 is a portion which constitutes a part of a constant velocity universal joint 262 which is mounted on one end of the left drive shaft which transmits power to the left rear wheel 26 (see FIG. 1).

The left drive shaft 143 includes the shaft 265 and the constant velocity universal joint 262 which is mounted on one end of the shaft 265.

The constant velocity universal joint 262 is constituted of an inner ring 266 which is joined to one end of the shaft 265 by spline engagement, a cage 267 which is slidably fitted on an outer surface of the inner ring 266, a plurality of balls 271 which are held by the cage 267 and, at the same time, are positioned movably in a plurality of inner-ring grooves 268 formed in the inner ring 266, and the above-mentioned outer ring 231 in which a plurality of outer-ring grooves 272 in which these balls 271 are positioned are formed. Here, numeral 274 indicates a retainer ring which prevents the removal of the inner ring 266 from the shaft 265.

The right drive axle forming member 228 is constituted of an outer ring 277 and a right drive axle 278 which is integrally formed on an end portion of the outer ring 277 by molding, wherein the outer ring 277 is a portion which constitutes a part of the constant velocity universal joint 282 which is mounted on one end of the right drive shaft 144 which transmits power to the right rear wheel 27 (see FIG. 1).

The right drive shaft 144 includes the shaft 285 and the constant velocity universal joint 282 which is mounted on one end of the shaft 285.

The constant velocity universal joint 282 is constituted of an inner ring 286 which is joined to one end of the shaft 285 by spline engagement, a cage 287 which is slidably fitted on an outer surface of the inner ring 286, a plurality of balls 291 which are held by the cage 287 and, at the same time, are positioned movably in a plurality of inner-ring grooves 288 formed in the inner ring 286, and the above-mentioned outer ring 277 in which a plurality of outer-ring grooves 292 in which these balls 291 are positioned are formed. Here, numeral 294 indicates a retainer ring which prevents the removal of the inner ring 286 from the shaft 285.

The sprocket support flange 232 is a part which mounts the driven sprocket 87 on a side surface of an outer peripheral portion thereon using a plurality of bolts 297 and nuts 298.

The disc support flange 236 is a part which mounts a brake disc 303 on a side surface of an outer peripheral portion thereon using a plurality of bolts 301.

As explained above in conjunction with FIG. 5 and FIG. 6, the invention is characterized in that the rear suspension arm brackets 112, 112 which constitute arm support portions for respectively supporting the lower arms 133, 134 which constitute the suspension arms are positioned on left and right sides of the vehicle body frame 11, the cross member 161 is extended between the vehicle body frame 11, (to be more specific the rear lower frames 51, 52) in the vicinity of these rear suspension arm brackets 112, 112, and the casing 151 is mounted on the cross member 161.

Due to such a constitution, it is possible to increase the rigidity of the rear lower frames 51, 52 in the vicinity of the rear suspension arm brackets 112, 112 and hence, the rigidity of the vehicle body frame 11 against inputting to the vehicle body frame 11 from the suspension can be easily ensured.

Figure 7:
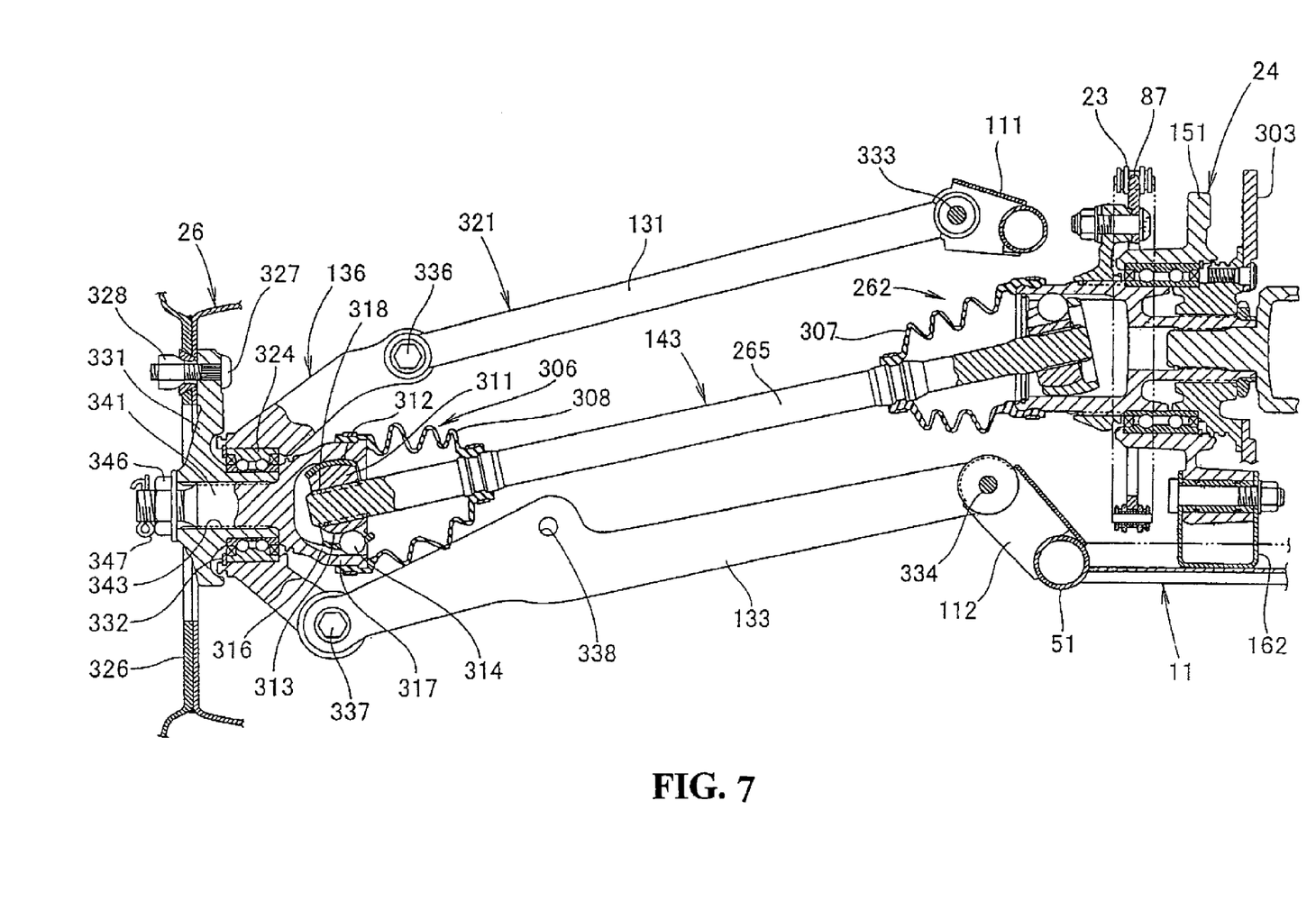
FIG. 7 is a cross-sectional view showing the drive shaft and the rear suspension of the vehicle according to the invention.

FIG. 7 is a cross-sectional view showing the drive shaft and the rear suspension of the vehicle according to the invention, wherein the left drive shaft 143 is constituted of the shaft 265, the constant velocity universal joint 262, and a constant velocity universal joint 306 which is mounted on a rear wheel 26 side of the shaft 265. Here, numerals 307, 308 respectively indicate rubber boots which are respectively provided to the constant velocity universal joints 262, 306

The constant velocity universal joint 306 is constituted of an inner ring 311 which is joined to another end of the shaft 265 by spline engagement, a cage 312 which is slidably fitted on an outer surface of the inner ring 311, a plurality of balls 314 which are held by the cage 312 and, at the same time, are positioned movably in a plurality of inner-ring grooves 313 formed in the inner ring 311, and the above-mentioned outer ring 317 in which a plurality of outer-ring grooves 316 in which these balls 314 are positioned is formed. Here, numeral 318 indicates a retainer ring which prevents the removal of the inner ring 311 from the shaft 265.

The rear suspension 321 which suspends the rear wheel 26 is constituted of an upper arm 131 which is swingably mounted on a rear suspension arm bracket 111, a lower arm 133 which is swingably mounted on rear suspension arm brackets 112, 113 (indicating only one symbol 112), knuckles 136 which are swingably mounted on respective distal ends of the upper arm 131 and the lower arm 133, and a hub 331 which is rotatably mounted on the knuckles 136 by way of bearings 324 and mounts a wheel 326 which constitutes the rear wheel 26 using a plurality of bolts 327 and wheel nuts 328. Here, numeral 332 indicates a retainer ring which prevents the removal of the bearing 324 from the knuckles 136.

Here, numeral 333 indicates bolts which connect the rear suspension arm bracket 111 and the upper arm 131, numeral 334 indicates bolts which connect the rear suspension arm brackets 112, 113 and the lower arm 133 respectively, numeral 336 indicates bolts which connect the upper arm 131 and the knuckles 136, numeral 337 indicates bolts which connect the lower arm 133 and the knuckles 136, and numeral 338 indicates mounting holes for mounting one end of the rear cushion unit which prevents the transmission of an impact from the rear wheel 26 to the vehicle body frame 11.

The outer ring 317 of the constant velocity universal joint 306 is integrally formed with the rear wheel axle 341 by molding, wherein the rear wheel axle 341 is a portion which is joined to a hollow portion 343 of the hub 331 by spline engagement. By joining a nut 346 on a distal end of the rear wheel axle 341 by thread engagement and by mounting a split pin 347 in a through hole (not shown in the drawing) which is formed on the distal end of the rear wheel axle 341, the removal of the hub 331 from the rear wheel shaft 341 is prevented.

Figure 8:
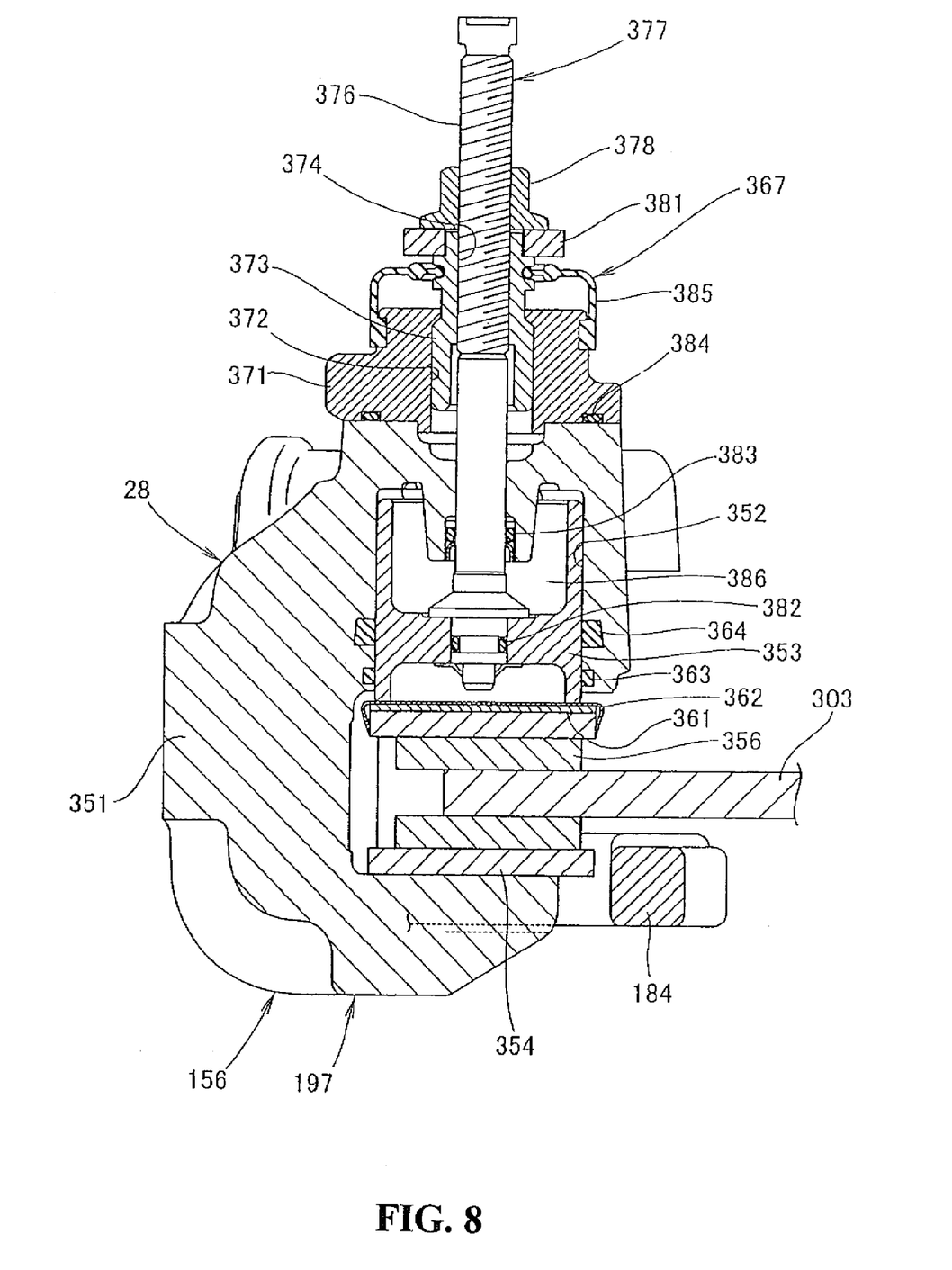
FIG. 8 is a cross-sectional view taken along a line 8-8 in FIG. 3.

FIG. 8 is a cross-sectional view taken along a line 8-8 in FIG. 3, wherein the disc brake device 28 is constituted of a brake disc 303 and a brake caliper 156 which performs the braking by sandwiching the brake disc 303. The brake caliper 156 is constituted of a caliper bracket 184 and a caliper body 197.

The caliper body 197 is constituted of a caliper body 351 which is formed in a substantially U-shape, a piston 353 which is movably inserted into a cylinder 352 which is formed in the caliper body 351, and a pair of pads 354, 356 which are movably held by the caliper body 351 and clamp the brake disc 303 due to a pushing force generated by the piston 353. Here, numeral 361 indicates a heat insulation material which is inserted between one pad 356 and the piston 353 and is held on the pad 356 by a leaf spring 362. Numerals 363, 364 indicate sealing members.

The brake caliper 156 is additionally provided with a parking brake mechanism 367 for allowing the disc brake device 28 to also function as a parking brake at the time of parking.

The parking brake mechanism 367 is constituted of a base portion 371 which is mounted on the caliper body 351, a hollow shaft 373 which is rotatably inserted into a through hole 372 formed in a base portion 371, a bolt member 377 which threadedly engages male threads 376 with female threads 374 formed in the hollow shaft 373 and mounts a distal end thereof on the piston 353, and an arm member 381 which is fixed to the hollow shaft 373 using the nut 378 for rotating the hollow shaft 373 with respect to the base portion 371 and the bolt member 377. Here, numerals 382 to 384 indicate O rings and numeral 385 indicates rubber boots.

In operating the disc brake device 28, a brake liquid pressure is applied to a liquid chamber 386 in the inside of the cylinder 352 which is filled with a brake liquid, the piston 353 is pushed to one pad 356.

Further, in operating the parking brake mechanism 367, by manipulating a parking brake lever not shown in the drawing, the arm member 381 is swung by way of a wire so as to rotate the hollow shaft 373. As a result, the bolt member 377 which is threadedly jointed to the hollow shaft 373 is moved in the axial direction thus pushing the piston 353 to the pad 356.

Returning to FIG. 3, the piston 353 of the brake caliper 156 (to be more specific, an axis 353*a* of the piston 353 (indicated by a point)) and the bolts 191, 192 which constitute a mounting portion of the brake caliper 156 on the casing 151 (to be more specific, respective axes 191*a*, 192*a* of the bolts 191, 192) are positioned on the same straight line 390 and, at the same time, in a state that a brand new chain 23 which is free from the elongation is extended with normal tension, a mounting portion of the casing 151 on the casing front mounting bracket 162 (to be more specific, an axis 248*a* of the bolt 248) is positioned on the above-mentioned straight line 390.

Accordingly, when the disc brake device 28 is operated and the brake disc 303 is clamped by the pads 354, 356 (see FIG. 8) due to the pushing force of the piston 353, since the bolt 248 is positioned in the direction of the braking force generated by the piston 353 (in the direction along the straight line 390 and also in the direction toward the bolt 191 from the piston 353), a moment about the bolt 248 is not generated whereby the braking force is effectively received from the vehicle body frame 11.

As has been explained heretofore, according to the invention, in the vehicle 10 in which the speed reduction device 24 which decreases the rotational speeds of the left drive axle 233 and the right drive axle 278 is mounted on the vehicle body frame 11, the brake caliper 156 which applies braking to the rotation of a brake disc 303 mounted on the left drive axle 233 is mounted on the casing 151 which constitutes the speed reduction device 24, and the piston 353 and the pads 354, 356 which constitute the clamping portion which applies braking to the brake disc 303 by clamping the brake disc 303 are provided to the brake caliper 156, the piston 353 and the pads 354, 356, to be more specific, the axis 353*a* of the piston 353, the mounting portion of the brake caliper 156 to the casing 151, to be more specific, the axes 191*a*, 192*a* of the bolts 191, 192, and the mounting portion of the casing 151 to the vehicle body frame 11, to be more specific, the axis 248*a* of the bolt 248 are positioned on one substantially straight line 390, and are positioned substantially parallel to the direction of a braking force.

Due to such a constitution, the direction of the braking force agrees with or becomes parallel to the direction that the above-mentioned straight line 390 extends and hence, the speed reduction device can effectively receive the braking force which acts on the piston 353, the pads 354, 356 whereby the structures of the mounting portion of the reduction device 24 and the mounting portion of the brake caliper 156 can be miniaturized and light-weight thus realizing the miniaturization and the reduction of weight of the vehicle 10.

Here, in this embodiment, as shown in FIG. 3, the front mounting elongated hole 166 is formed in the front mounting portion 153 of the casing 151 and the front circular holes 168, 168 are formed in the casing front mounting bracket 162. However, the invention is not limited to such a constitution, and a circular hole may be formed in the front mounting portion 153 and elongated holes which are elongated in the longitudinal direction may be formed in the case front mounting bracket 162.

The mounting structure of a speed reduction device and a brake device of the invention is preferably applicable to a two wheeled vehicle and a four wheeled vehicle.

We claim:

1. A mounting structure for a speed reduction device of a vehicle, comprising:
    a vehicle frame;
    a casing mounted on said vehicle frame at a casing mounting portion;
    a brake caliper mounted to said casing at a caliper mounting portion;
    a brake disc mounted on a drive axle of the vehicle; and
    a clamping portion mounted on said brake caliper for applying clamping force to said brake disc,
    wherein said clamping portion, said caliper mounting portion, and said casing mounting portion are positioned on a substantially straight line, and are positioned substantially parallel to the direction of braking force.

2. The mounting structure of claim 1, wherein said vehicle frame includes,
    arm supporting portions which respectively support suspension arms formed on opposite sides of said vehicle frame, and
    a cross member extending between said opposite sides of said vehicle frame, said cross member supporting said casing.

* * * * *